United States Patent
Hart et al.

(10) Patent No.: US 8,207,707 B2
(45) Date of Patent: Jun. 26, 2012

(54) METHOD AND APPARATUS TO PROVIDE FIXED FREQUENCY CHARGING SIGNALS TO A BATTERY AT OR NEAR RESONANCE

(75) Inventors: William Stephen Hart, Plano, TX (US); Brian L. Graham, Carrollton, TX (US); John Arthur Fee, Garland, TX (US); Laszlo Szerenyi, St. Petersburg, FL (US)

(73) Assignee: Advanced Battery Management, LLC, Irving, TX (US)

( * ) Notice: Subject to any disclaimer, the term of this patent is extended or adjusted under 35 U.S.C. 154(b) by 110 days.

(21) Appl. No.: 12/148,707

(22) Filed: Apr. 21, 2008

(65) Prior Publication Data
US 2008/0265842 A1    Oct. 30, 2008

Related U.S. Application Data

(60) Provisional application No. 60/925,436, filed on Apr. 20, 2007.

(51) Int. Cl.
*H02J 7/00*    (2006.01)
(52) U.S. Cl. .................................................. 320/137
(58) Field of Classification Search ........... 320/141–144
See application file for complete search history.

(56) References Cited

U.S. PATENT DOCUMENTS

| | | | | |
|---|---|---|---|---|
| 5,541,495 A | * | 7/1996 | Gali | 320/165 |
| 5,633,575 A | * | 5/1997 | Gali | 320/140 |
| 5,783,929 A | * | 7/1998 | Taricco | 320/139 |
| 5,891,590 A | * | 4/1999 | King | 429/49 |
| 6,078,166 A | * | 6/2000 | Taricco | 320/141 |
| 6,144,188 A | * | 11/2000 | Okada et al. | 320/141 |
| 2006/0208694 A1 | | 9/2006 | Fee | |
| 2006/0208703 A1 | | 9/2006 | Fee | |
| 2007/0170890 A1 | * | 7/2007 | Fee et al. | 320/128 |

OTHER PUBLICATIONS

Report—EPO, Sep. 9, 2008, Fee.

* cited by examiner

*Primary Examiner* — Ramy Ramadan
(74) *Attorney, Agent, or Firm* — Larkin Hoffman Daly & Lindgren Ltd; Robert C. Klinger

(57) ABSTRACT

A battery charger with a fixed frequency charging signal at or near the resonant frequency of the battery to be charged is presented. The present invention utilizes a microprocessor to modulate a current source at or near the resonant frequency of the battery to be charged without the use of a PLL. To simplify conventional modulated battery chargers, the PLL or other methods of phase correction are removed, reducing most of the calculation requirements for adjusting the phase angle, thereby reducing the piece count and ultimately cost and complexity. The result is a solution wherein charging occurs at or near the resonant frequency of the battery, and although suboptimal, the results are superior to traditional charging methods.

6 Claims, 2 Drawing Sheets

Charge Electronics**

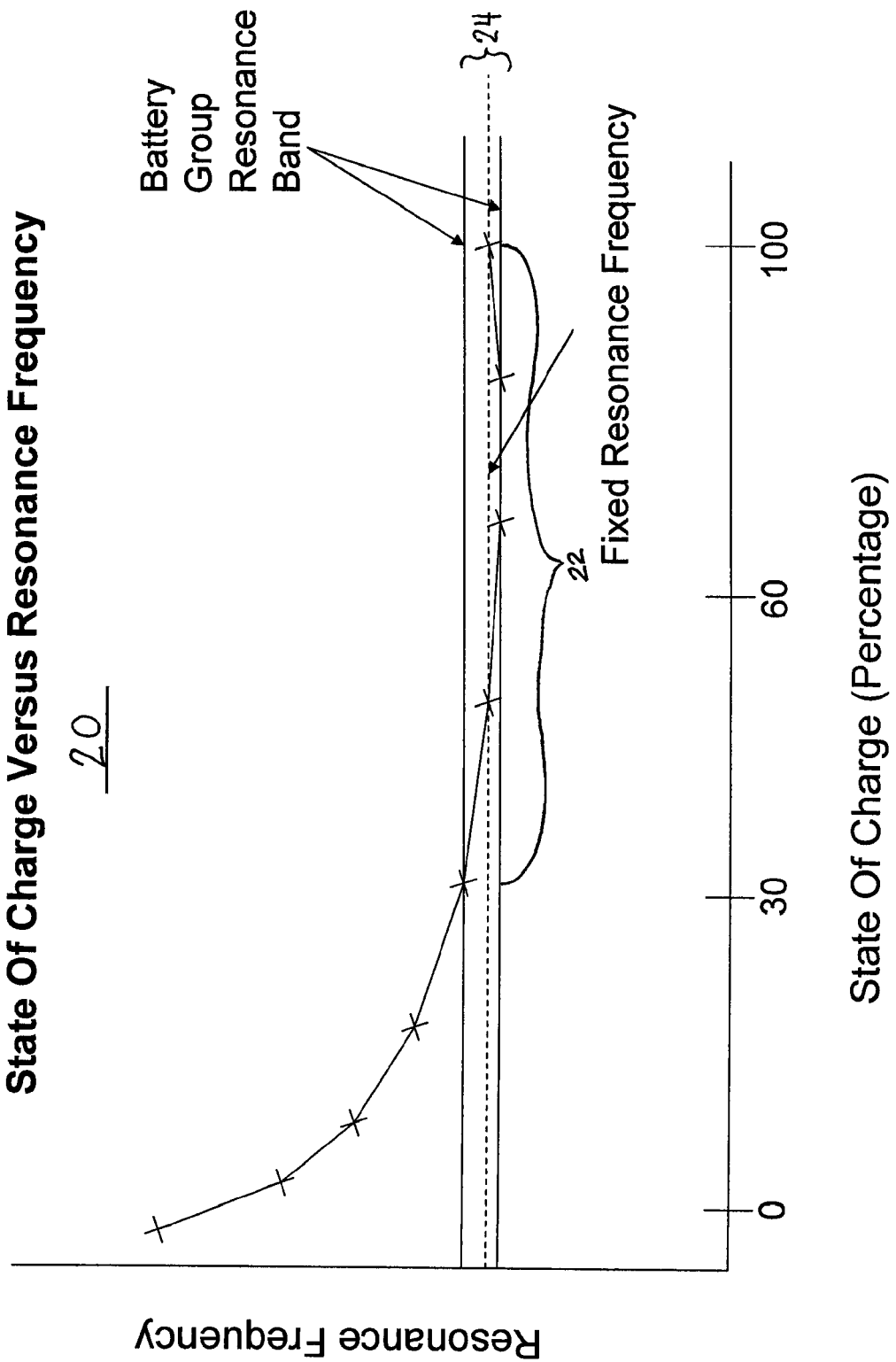

METHOD AND APPARATUS TO PROVIDE FIXED FREQUENCY CHARGING SIGNALS TO A BATTERY AT OR NEAR RESONANCE

CLAIM OF PRIORITY

This application claims priority of U.S. Provisional Ser. No. 60/925,436 entitled "Method and Apparatus to Provide Fixed Frequency Charging Signals to a Battery at or Near Resonance" filed Apr. 20, 2007, the teachings of which are incorporated herein by reference.

CROSS REFERENCE TO RELATED APPLICATIONS

This application is related to co-pending patent application Ser. No. 11/728,462, entitled "METHOD AND APPARATUS FOR A REMOTE BATTERY CHARGER WITH A SELF-CONTAINED POWER SOURCE", filed Mar. 26, 2007, the teachings of which are incorporated herein by reference.

FIELD OF THE INVENTION

The present invention generally related to battery chargers, and more specifically to fixed frequency battery chargers charging at or near the resonant frequency of the battery to be charged.

BACKGROUND OF THE INVENTION

Today's battery chargers usually provide charging signals of the Constant Current, Constant Voltage (CCCV) type to a battery. Such charging signals do not charge the battery in the most energy efficient manner. Charging batteries by the CCCV method wastes energy, which manifests as heat in the battery, thereby reducing its lifetime. This one size fits all CCCV battery charging approach also degrades the performance of the battery over time.

Current methods used by applicant utilize a Phase-Locked Loop (PLL) to track the resonance of the battery as it is charged. There are certain costs associated with the use of the PLL, such as Analog to Digital Converters (ADCs) for both voltage and current and associated calculations which require a high degree of processing power. Additionally, phase correction is needed, adjusting the Voltage/Current phase back to zero and continuous determination of the frequency at which the phase angle equals zero.

SUMMARY OF INVENTION

The present invention achieves technical advantages as a battery charger with a fixed frequency charging signal at or near the resonant frequency of the battery to be charged. One embodiment of the invention utilizes a microprocessor to modulate a current source at or near the resonant frequency of the battery to be charged without the use of a PLL. To simplify the battery charger, the PLL is stripped away, reducing most of the calculation requirements for adjusting the phase angle, thereby reducing the piece count and therefore cost and complexity. The result is a low cost solution wherein charging occurs at or near the resonant frequency of the battery, yielding results that are superior to traditional CCCV charging methods.

BRIEF DESCRIPTION OF THE DRAWINGS

FIG. 2 is a diagram of frequency versus State Of Charge (SOC) in accordance with an exemplary embodiment of the present invention.

DETAILED DESCRIPTION OF THE PRESENT INVENTION

Figure 1:
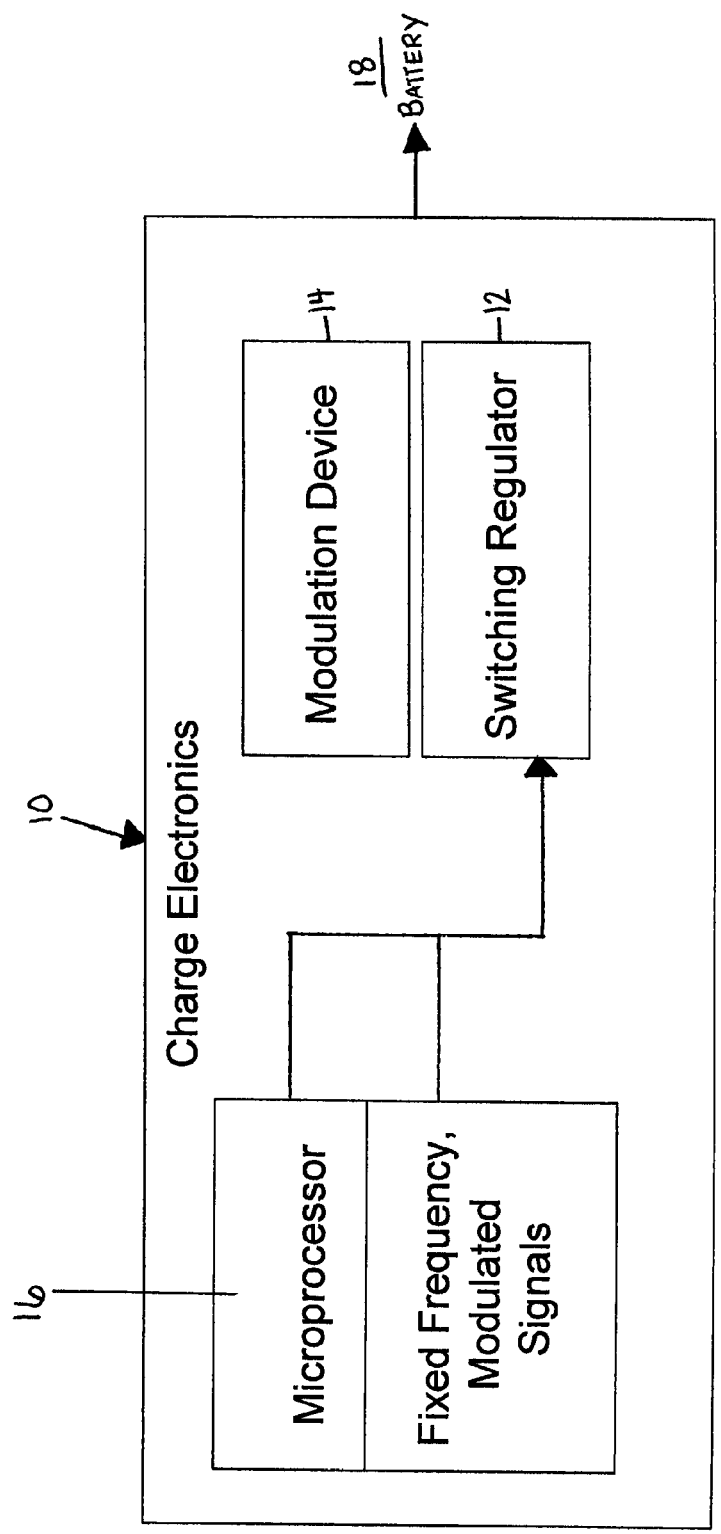
FIG. 1 is a diagram of an exemplary embodiment in accordance with the present invention.

The use of a fixed frequency modulated signal of any waveform is used to provide a charging signal to a battery. The process of supplying current to the battery until a termination event occurs is employed. The battery is probed to determine certain battery characteristics which indicate the battery chemistry, voltage determination, capacity determination, as well as other relevant parameters. The characteristics of the battery are correlated with a look-up table to determine the optimal charging parameters, such as resonant frequency, charge duration, etc, for the battery.

Referring to FIG. 1, there is shown at 10 a block diagram of a current source configured to charge a battery. The charging device 10 consists of a power supply 12, and a modulation device 14. The power supply is a Switched Mode power supply configured to be used as a current source, whose output is modulated by a microprocessor 16. Fixed frequency, modulated signals, of any waveform, are used to charge the battery 18. Charging with a modulated current source at or near the resonant frequency of the battery 18 provides efficient energy transfer into the battery.

Referring now to FIG. 2, there is shown at 20 a diagram of frequency (F) versus State Of Charge (SOC) in accordance with an exemplary embodiment of the present invention. The battery charging starts at a relatively high frequency for a low SOC, in some cases 5 kHz to 10 kHz. The battery then begins to charge. As the SOC increases over the charge time, the apparent resonance frequency ultimately settles out to a final value. Within a range 22 located along the flattest part of the curve, after about a 30% SOC in this example, resonance points appear within a group resonance band 24 being a function of a battery type. The particular group frequency chosen as the modulation frequency for the charging current for the battery type applies to the flattest part of the battery SOC band 24. The width of the band 24 varies from battery type to battery type (type, chemistry, and manufacturer) which is approximately in the mid-point of the representative band.

In one embodiment for a specific battery type, the resonance band lies anywhere between a maximum frequency, Fmax, of around 350 Hz, down to around 75 Hz. An F band is determined showing the frequency boundaries that are optimal for charging.

One method employed in fixed frequency charging of the battery uses "Group Battery Resonance" in which the resonant frequency of a plurality of batteries with common characteristics or parameters are measured by a testing apparatus, wherein the resonant frequencies are averaged to determine a group resonance, which is nearly equivalent to each individual battery's resonance, but will work well with all batteries of the group. Within a battery manufacturer's production, variances occur in manufacturing tolerances. If several different manufacturers' batteries are measured and groups of these batteries exhibit near the same resonance, each group can be charged with a fixed frequency charging signal modulated at the respective group resonance. In some cases, the group resonance signal frequency may be constant through the entire charge; in other cases the resonance may change as a function of State Of Charge (SOC), if the change in battery group resonance as a function of SOC is known. In addition, batteries are usually grouped by size and batteries that exhibit similar properties within that size. The charger can apply similar charging logic i.e. group resonance to that battery size. This allows the charger to apply common charging logic either to battery size or group resonance as a function of batteries with similar characteristics.

The present invention achieves technical advantages by reducing costs by eliminating the complexity and additional components associated with the use of the PLL, while yielding results that are superior to other charging techniques.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A method of charging a battery, comprising:
   establishing a natural resonant frequency of each battery of a group of batteries each having a common characteristic, at least some of the batteries in the group having different resonant frequencies;
   establishing a group resonant frequency being a function of the resonant frequencies of the group of batteries, wherein the established resonant frequencies of the batteries in the group are correlated to establish a band of the group resonant frequency; and
   applying a charging current to a battery in the group at the group resonant frequency.

2. The method as specified in claim 1 wherein the established resonant frequency of each said battery is a function of the common characteristic of the respective battery when its state-of-charge (SOC) is substantially less than 100%.

3. The method as specified in claim 2 wherein each said battery resonant frequency is established over a range of SOC.

4. The method as specified in claim 2 wherein the established resonant frequency of each said battery is a function of the common characteristic of the battery at a SOC being less than 50%.

5. The method as specified in claim 4 wherein the SOC is less than 40%.

6. The method as specified in claim 5 wherein the SOC is about 30%.

* * * * *